United States Patent [19]

Greenwood

[11] Patent Number: 4,718,299
[45] Date of Patent: Jan. 12, 1988

[54] DRIVELINE FOR A TRACK LAYING VEHICLE

[75] Inventor: Christopher J. Greenwood, Leyland, United Kingdom

[73] Assignee: Leyland Vehicles Limited, Leyland, England

[21] Appl. No.: 56,315

[22] Filed: May 29, 1987

Related U.S. Application Data

[63] Continuation of Ser. No. 698,429, Feb. 5, 1985, abandoned.

[30] Foreign Application Priority Data

Feb. 7, 1984 [GB] United Kingdom ............... 8403199
Mar. 20, 1984 [GB] United Kingdom ............... 8407148

[51] Int. Cl.$^4$ ............................................ F16H 37/06
[52] U.S. Cl. ......................................... 74/691; 74/687; 74/705; 74/720; 74/720.5
[58] Field of Search ................. 74/681, 682, 687, 690, 74/691, 705, 714, 720, 720.5; 180/6.44, 6.7

[56] References Cited

U.S. PATENT DOCUMENTS

| | | | |
|---|---|---|---|
| 3,545,303 | 12/1970 | Whelahan | 74/720.5 |
| 3,575,066 | 4/1971 | Livezey et al. | 74/687 X |
| 3,583,256 | 6/1971 | Livezey | 74/720.5 |
| 3,596,535 | 8/1971 | Polak | 74/687 X |
| 3,815,698 | 6/1974 | Reed | 74/720.5 X |
| 3,866,490 | 2/1975 | Orshansky | 74/691 X |
| 3,938,604 | 2/1976 | Kugler et al. | 74/720.5 X |
| 3,966,005 | 6/1976 | Binger | 74/720.5 X |
| 4,215,755 | 8/1980 | Waterworth et al. | 74/720.5 X |
| 4,258,585 | 3/1981 | Orshansky et al. | 74/687 |
| 4,309,917 | 1/1982 | Leet | 74/687 X |
| 4,327,603 | 5/1982 | Zaunberger et al. | 74/720.5 X |
| 4,345,488 | 8/1982 | Reed | 74/682 |
| 4,485,691 | 12/1984 | Reed | 74/720.5 X |
| 4,497,218 | 2/1985 | Zaunberger et al. | 74/714 X |
| 4,505,168 | 3/1985 | Booth et al. | 74/687 |
| 4,519,274 | 5/1985 | Maruyama et al. | 74/714 X |

*Primary Examiner*—Leslie Braun
*Assistant Examiner*—Dwight G. Diehl
*Attorney, Agent, or Firm*—Thomas J. Greer, Jr.

[57] ABSTRACT

A driveline for a track-laying vehicle having a prime mover and a pair of output shafts (L, R) connected to drive left- and right-hand tracks comprises: two similar continuously-variable-ratio transmissions (10, 20) of the toroidal race-rolling traction type, each having an input adapted to receive input drive from the prime mover and an output; a cross shaft (CS); two similar summing epicyclic gear output units (12, 22) each having a first input (70, 80) geared to the output of a respective transmission unit, an output connected to a respective output shaft (73, 83), and a second input (72, 82) connected to the cross shaft; gear drain (30) for connecting the input drive to the cross shaft at a first predetermined ratio, for low regime operation; a middle regime differential gear arrangement (40) having two inputs connectable at second and third predetermined gear ratios respectively to the corresponding first inputs of the output epicyclic gear units, and an output connectable at a fourth predetermined gear ratio to the cross shaft, operable in a middle regime; and gear drain (50) for connecting the input drive to the cross shaft at a fifth predetermined ratio, for high regime operation. This can provide a particularly compact and effective steerable continuously variable transmission.

8 Claims, 9 Drawing Figures

DRIVELINE FOR A TRACK LAYING VEHICLE

This applicaton is a continuation, of Ser. No. 698,429, filed Feb. 5, 1985 now abandoned.

This invention relates to a driveline for a track-laying vehicle, the driveline including a pair of continuously-variable ratio transmission units, the units controlling the gear ratios for both propulsion and for steering.

The invention consists in a driveline for a track-laying vehicle having a prime mover and a pair of output shafts connected to drive left- and right-hand tracks, the driveline comprising: two similar continuously-variable-ratio transmissions of the toroidal race-rolling traction type, each having an input adapted to receive input drive from the prime mover and an output; a cross shaft; two similar summing epicyclic gear output units, each having a first input geared to the output of a respective transmission unit, an output connected to a respective output shaft, and a second input connected to the cross shaft; means for connecting the input drive to the cross shaft at a first predetermined ratio, for low regime operation; a middle regime differential gear arrangement having two inputs connectable at second and third predetermined gear ratios respectively to the corresponding first inputs of the output epicyclic gear units, and an output connectable at a fourth predetermined gear ratio to the cross shaft, operable in a middle regime; and means for connecting the input drive to the cross shaft at a fifth predetermined ratio, for high regime operation.

The said first to fifth predetermined gear ratios are preferably such that the driveline is capable of synchronous change between low- and middle- regimes and between middle- and high- regimes.

In a preferred embodiment, the means for connecting the input drive to the cross shaft comprises at least one gear train comprising a low regime clutch, the clutch being engageable in low regime only. As a further preferred feature, one of the inputs to the middle regime differential gear arrangement is connectable to its respective summing epicyclic gear by means of a middle regime clutch engageable only in middle regime. Advantageously, the differential gear arrangement is a simple epicyclic gear whose inputs and output are its sun, planet carrier and annulus.

As a further desirable feature, the means for connecting the input drive to the cross shaft for high regime operation comprises a high regime clutch in series between the input drive and the cross shaft, and engageable only in high regime.

The driveline preferably includes an automatic electronic control system, advantageously comprising a microprocessor, which controls the gear ratios adopted by the two transmissions, and the engagement of the said clutches, in response to external conditions in the said vehicle.

The summing epicyclic gears are advantageously simple epicyclic gears but may be for example compound epicyclic gears.

The invention also consists in a track-laying vehicle having left- and right- hand tracks, each having a respective output shaft, a prime mover, and a driveline of one of the types described above, between the output shafts and the prime mover.

In order that the invention may be better understood, a preferred embodiment will now be described with reference to the accompanying drawings, wherein.

Figure 7:
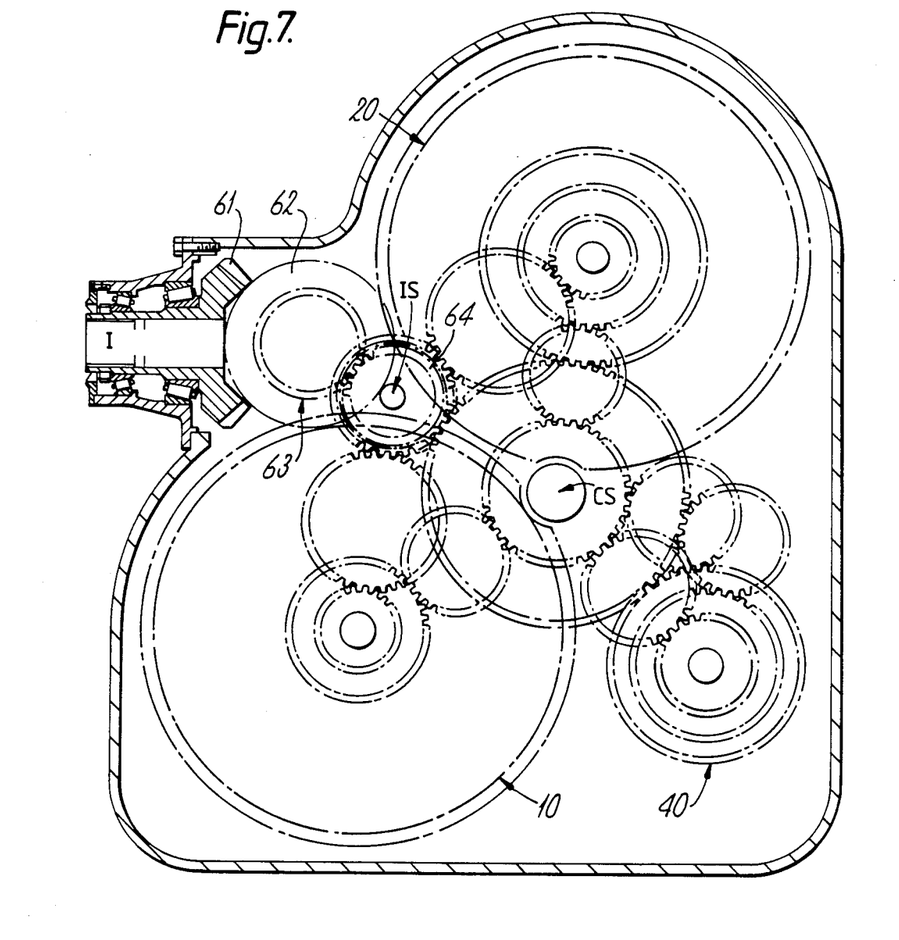
FIG. 7 is a cross-sectional view of one disposition of the components of the driveline of FIG. 1.

In FIGS. 1 to 4, the broken lines represent an actual connection between the gears at their ends; there is no intermediate gear train. This is because the actual disposition of the components, shown in section in FIG. 7, is more compact than can easily be represented in the schematic two-dimensional FIGS. 1 to 4, in which the components are exploded.

Figure 1:
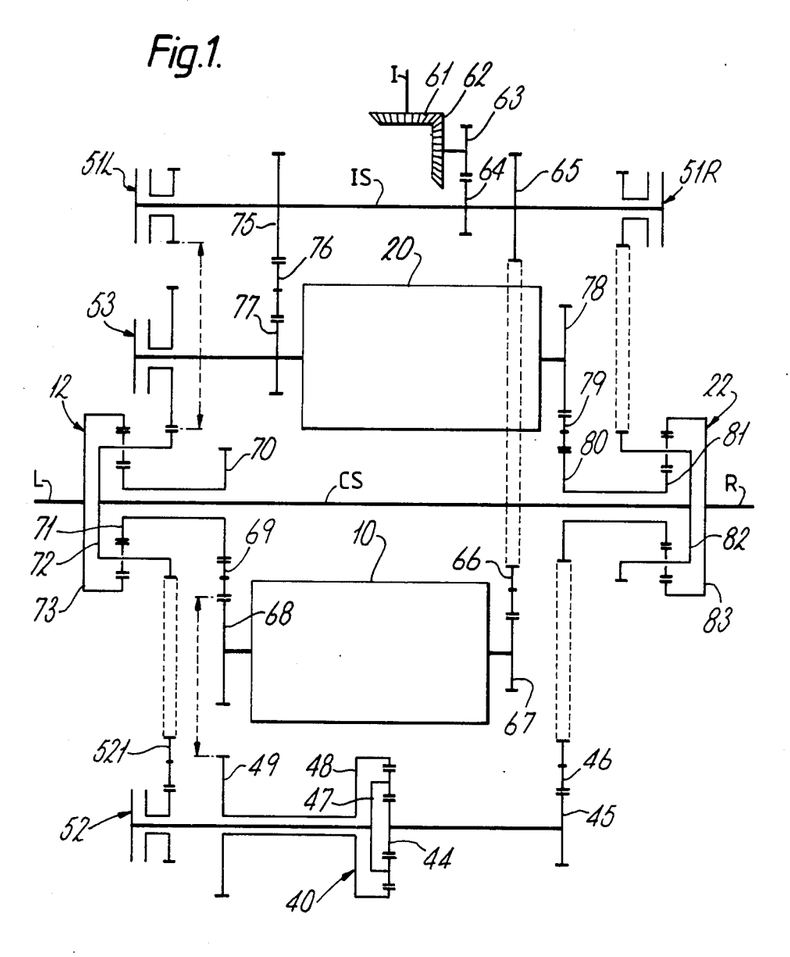
FIG. 1 is a partially exploded schematic diagram showing the components of the preferred driveline.

Drive I, FIG. 1, from a prime mover such as a diesel engine is transmitted by way of the driveline to left- and right- hand tracks of a track-laying vehicle. The driveline is controlled by an automatic electronic control system comprising a microprocessor, which senses vehicle conditions including throttle demand, steering demand and output shaft speed, and senses the condition of various components of the driveline, and determines the engagement of clutches and the transmission gear ratios within the driveline, as described below. The control system operates the driveline in one of three discrete modes, referred to as the low-, medium- and high- regimes. Low regime is for reverse and slow forward vehicle speeds, medium regime for intermediate forward speeds, and high regime for fast forward speeds. The transitions between the regimes are synchronous and automatic. Steering is effected by automatically controlled adjustment of the relative output shaft speed, by differential changes in the gear ratios of the two transmission units, as described below. Steering is effective equally in all regimes, and at the regime transitions.

The features of the driveline common to all regimes will be described first. Two identical continuously variable ratio transmissions of the toroidal race-rolling traction type, referred to as variators 10, 20, each have an input 67 (77) connected by way of a gear 66 (76) to a gear 65 (75) on an input cross shaft IS. Such transmissions are described for example in paper number 80-C2/DET-59 of the American Society of Mechanical Engineers as well as in U.K. Pat. No. 2023753 and European Pat. No. 6690.

Drive I reaches the input shaft IS by a pair of bevel gears 61,62, which conveniently rotate the drive through a right-angle, and further gears 63,64.

A pair of simple epicyclic output gears 12, 22 having sun gears 71,81, planet carriers 72,82, and annuli 73,83, are arranged on the left- and right- hand sides of the vehicle. In this example, the required gear ratios are obtained by connecting the annulus 73 (83) to drive the respective output shaft L (R), the planet carrier 72 (82) to a common cross shaft CS, and the sun 71 (81) by way of an extension 70 (80) and a further gear 69 (79) to the output 68 (78) of a respective variator 10 (20).

Steering is effected in all regimes by the same method. This is to increase the gear ratio of one variator 10 (20) while decreasing the gear ratio of the other variator 20 (10) by the same differential. One track is then forced to turn at a different speed from the other, such that even stationary steering is possible. Moreover, there is no change in the steering angle or degree when regime change occurs; this is ensured by arranging the gear ratios to give synchronous regime changes, and by using a narrower range of gear ratios in each variator than is available. By allowing a margin of gear ratio at each extreme, it is possible to introduce a steering differential in either direction even at regime change. Moreover, steering sense is preserved over regime changes. In this example, a differential of 0.1 in variator ratio for steering results in a differential of 0.06 in the gear ratio between the input I and the output L (R). This will become clearer below with reference to FIGS. 5 and 6.

Figure 3:
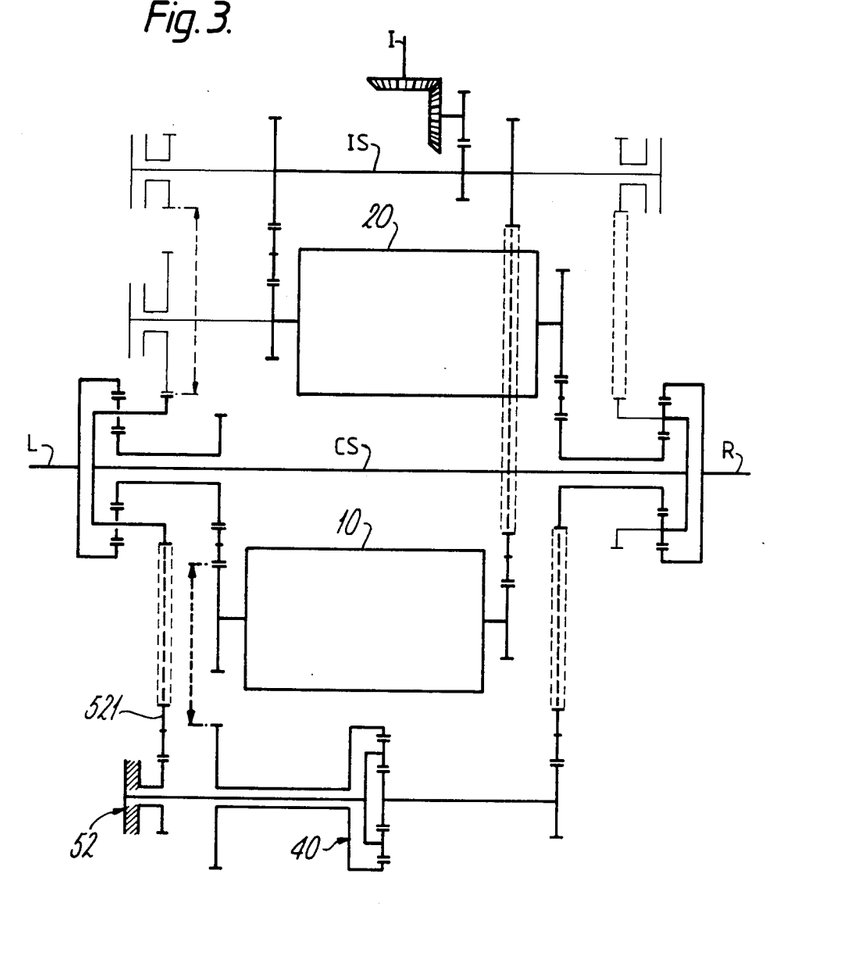
Figure 4:
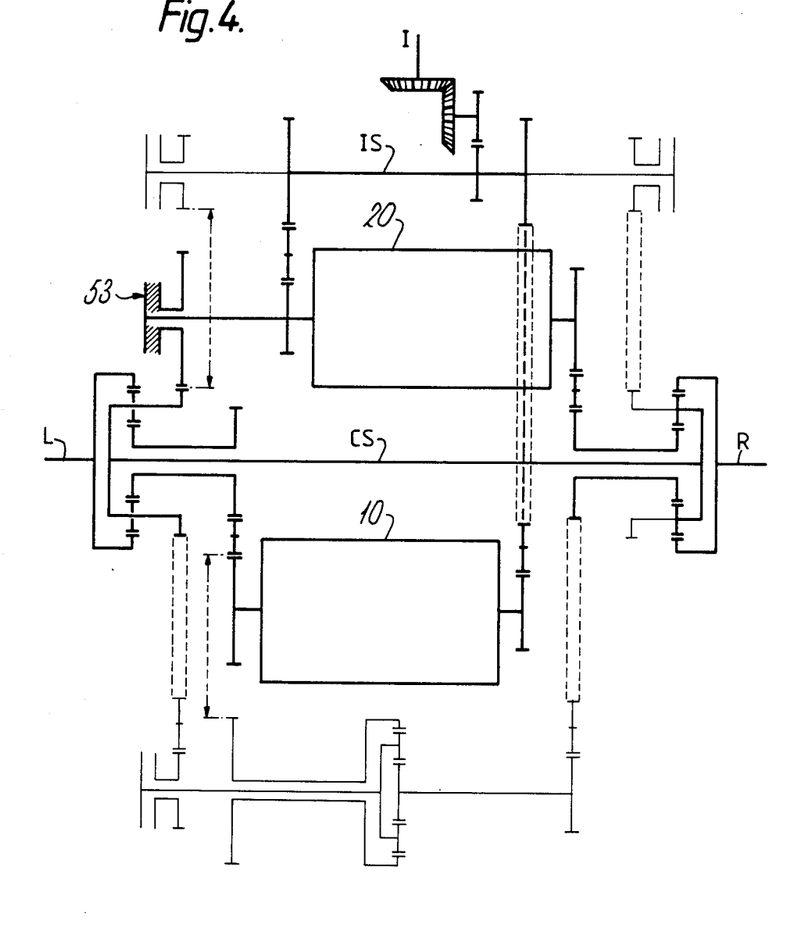
Figure 5A:
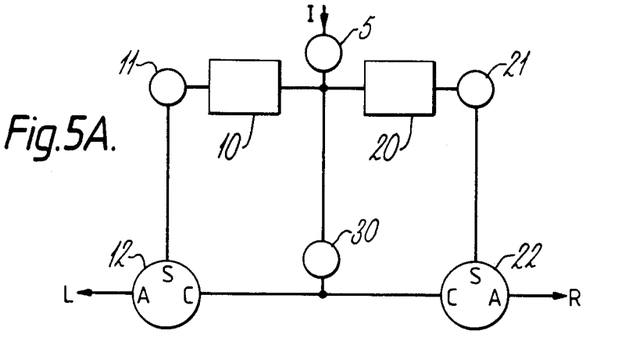
FIGS. 5A to 5C are block schematic diagrams of the driveline of FIG. 1, indicating the gear trains and effective gear ratios involved in the low, medium and high regimes of operation respectively.
Figure 5B:
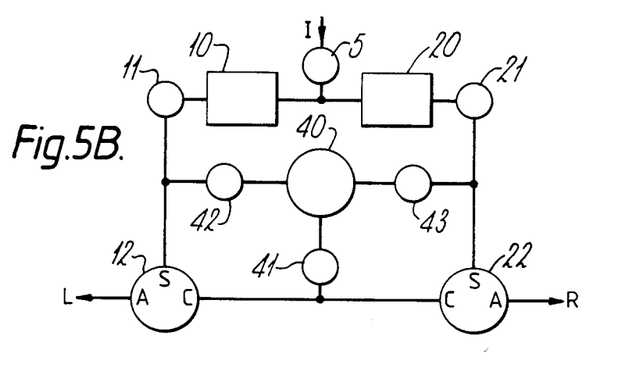
Figure 5C:
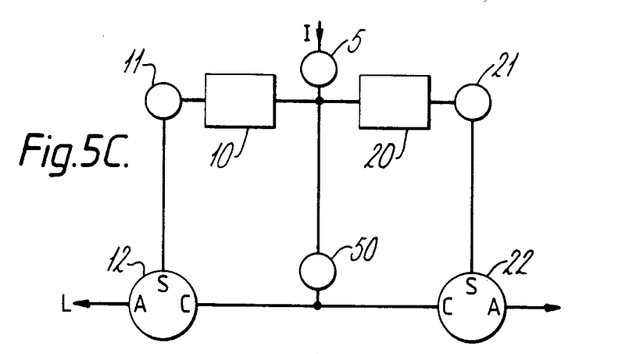

In FIGS. 5A to 5C, lines represent drive couplings, while circles represent gear ratio changes of predetermined amounts. In FIG. 5A, gear trains 5, 11, 21 and 30 represent gears 61-64, 68-70, 78-80 and low regime clutches 51L, 51R (FIG. 2), respectively. In FIG. 5B, gear trains 40, 41, 42 and 43 represent a middle regime simple epicyclic gear 40, a middle regime clutch 52 (FIG. 3), gear 49, and gears 45, 46, respectively. In FIG. 5C, gear train 50 represents high regime clutch 53 (FIG. 4).

Figure 6:
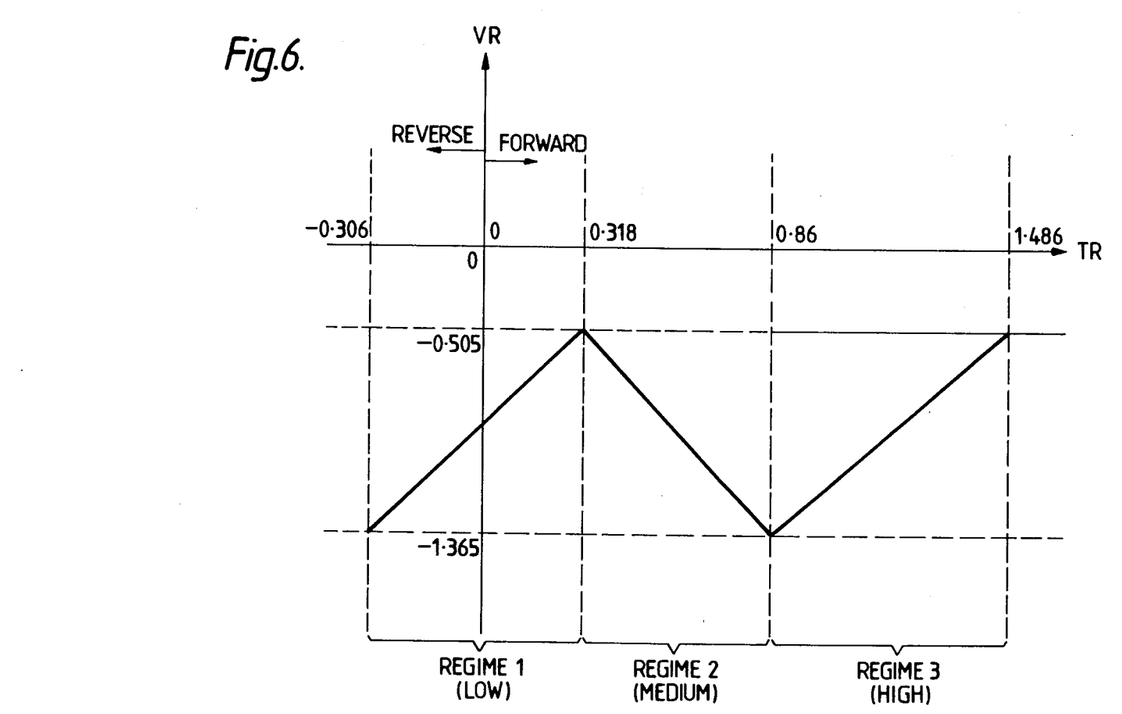
FIG. 6 is a graph illustrating the relationship between the overall transmission ratio and the gear ratio in each transmission, for all three regimes of operation of the driveline of FIG. 1.

In FIG. 6, which is a graph of the overall transmission ratio TR (between input I and output shafts L,R) against the mean variator ratio VR, forward vehicle speeds produced as a result of positive transmission ratios TR are indicated "FOWARD", and reverse speeds are indicated "REVERSE". The heavy line indicates the variation of VR as the ratio TR goes from regime 1 (low regime) through regime 2 (medium regime) to regime 3 (high regime).

Figure 2:
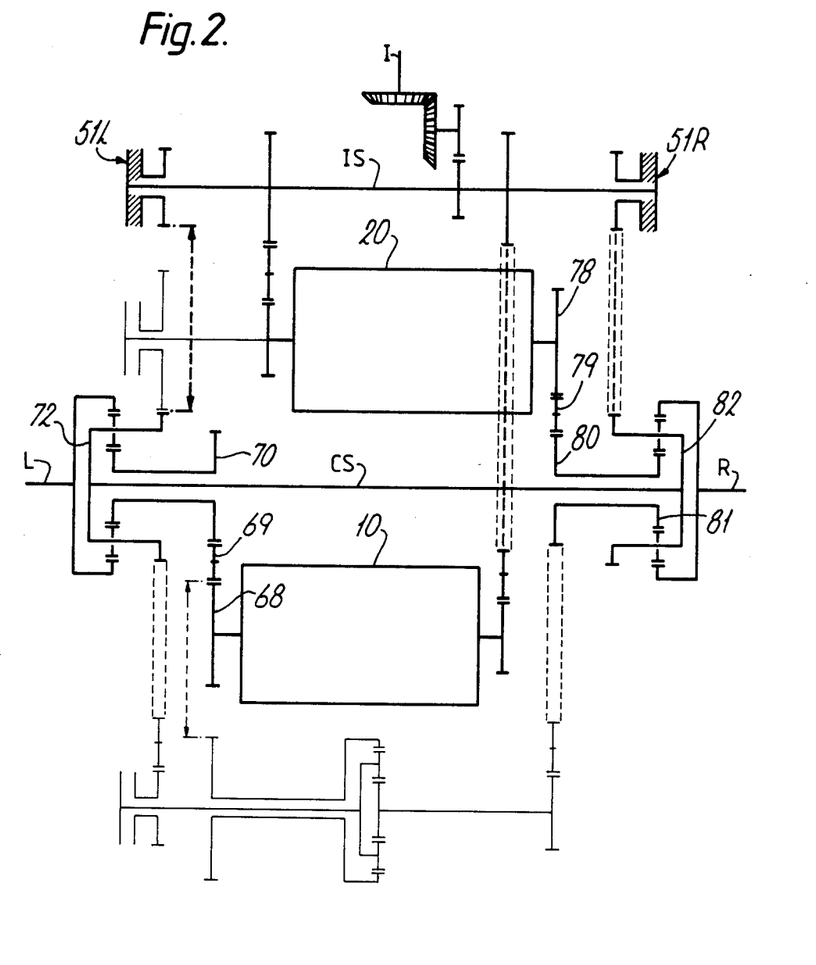
FIGS. 2 to 4 indicate the driveline of FIG. 1 in its low, medium and high regimes of operation respectively, the active parts being highlighted.

The low regime operation will now be described, with reference to FIGS. 2, 5A and 6. In low regime, each variator ratio (between input and output speeds) is variable between −1.365 and −0.505, while the overall transmission ratio goes from −0.306 to 0.318. Steering differentials may extend this range by a small amount if steering is effected close to a regime change. As stated above, to allow for steering at regime extremes, there is a margin at each extreme of the variator ratio range, since a typical useable ratio span is from about −1.5 to −0.4. As shown in FIG. 2, drive from the input I reaches the input shaft IS and then the planet carrier 72 (82) of each output epicyclic by way of a clutch 51L (51R). Two clutches 51L, 51R are employed to transmit a very high "geared neutral" torque which is required of this transmission. As shown most clearly in FIG. 5A, power is recirculated within both transmissions 10, 20.

Change between low and middle regimes occurs synchronously, with the variator mean ratio at −0.505. Going from low to medium regime, clutches 51L and 51R are disengaged and clutch 52 is engaged.

The medium regime will now be described with reference to FIGS. 3, 5B and 6. The medium regime clutch 52, FIG. 3, connects the planet carrier of the differential simple epicyclic 40 to the main cross shaft CS by way of a gear 521 and the planet carrier 72 of the left-hand simple epicyclic 12. As shown clearly in FIG. 5B, there is no power recirculation within the variators 10, 20; the complete gear train 40-43 between the sun gears of the epicyclics 12, 22 functions as a differential so that drive to the main cross shaft CS (taken on the left-hand planet carrier 72) is the average output speed of the variators 10, 20. Any gear train that acts as a differential in this way could be used in place of the proposed simple epicyclic arrangement.

The change from medium to high regimes is also synchronous, and as shown in FIG. 6 occurs with the variator mean ratio at −1.365 and the overall transmission ratio at 0.86.

High regime will now be described with reference to FIGS. 4, 5C and 6. The variator range is again from −1.365 to −0.505, as in low regime, while the ratio of gear train 50 is such that the overall transmission ratio goes from 0.86 to 1.486, corresponding to maximum forward speed.

In high regime, clutch 53 is engaged, between the input shaft IS (via gears 75, 76 and an extension of the variator 20 input 77) and the main cross shaft CS (via planet carrier 72). The other clutches 51L, 51R and 52 are of course disengaged. As shown in FIG. 5C, the driveline functions in a similar way to low regime, with power recirculation.

The actual disposition of the components of the driveline is shown in FIG. 7, in which the components have the same reference numerals as elsewhere in this description. Heavy loads required of this driveline dictate large variators, hence a compact packaging arrangement, but alternative dispositions are envisaged.

In the present example, the values chosen for gear trains 5, 11, 21, 30, and epicyclics 12, 22, FIG. 5A, are 1.458, −0.995, −0.995, 0.313, and −2.0, −2.0. In FIG. 5B, gear trains 41, 42 and 43 have ratios 0.623, 1.5 and 0.75, and the differential epicyclic 40 has a ratio 2.0. In FIG. 5C, gear train 50 has a ratio 0.847. Clearly the invention is not restricted to the particular gearing arrangements chosen, nor to the values of ratios chosen, except where so claimed.

I claim:

1. A driveline for a track-laying vehicle having a prime mover and a pair of output shafts (L, R) connected to drive left- and right-hand tracks at a predetermined range of speeds, the driveline comprising: two similar continuously-variable-ratio transmission units (10, 20) of the toroidal race-rolling traction type, each having an input adapted to receive input drive from the prime mover and an output; a cross shaft (CS); two similar summing epicyclic gear output units (12, 22), each having a first input (70, 80) geared to the output of a respective transmission unit, an output connected to a respective output shaft (73, 83), and a second input (72, 82) connected to the cross shaft; rotating clutch means (51) connecting the input drive to drive the cross shaft at a first predetermined ratio at which a variation of transmission ratio of the transmissions towards zero will correspond to an increase in track speed, for low regime operation; a middle regime differential gear arrangement (40); rotating clutch means (52) connecting the middle regime differential gear arrangement to have two inputs connected at second and third predetermined gear train ratios respectively to the corresponding outputs of the transmission units and an output connected at a fourth predetermined gear train ratio to the cross shaft such that the cross shaft is driven by the outputs of the two transmission units, to be operable in a middle regime; and means (50) for connecting the input drive to the cross shaft at a fifth predetermined gear train ratio, for high regime operation.

2. A driveline as claimed in claim 1, wherein the said middle regime differential gear comprises an epicyclic.

3. A driveline as claimed in claim 2, wherein the said first to fifth gear train ratios are such that the driveline is capable of synchronous change between low and middle regimes and between middle and high regimes.

4. A driveline as claimed in claim 3, wherein the gear ratios of the said continuously-variable-transmissions at the points of synchronous change are a small amount within the possible extremes of ratio available to the continuously-variable-transmissions, thereby to allow steering close to synchronous change points.

5. A driveline as claimed in claim 1, wherein the means for connecting the input drive to the cross shaft comprise at least one gear train comprising a low regime clutch (51).

6. A driveline as claimed in claim 1, wherein the output of the middle regime differential is connectable to the cross shaft (CS) by means of a middle regime clutch (52).

7. A driveline as claimed in claim 1, wherein the means for connecting the input drive to the cross shaft for high regime operation are engaged by means of a high regime clutch (53).

8. A driveline as claimed in claim 1, wherein the said summing epicyclic gears are simple epicyclic gears.

* * * * *